United States Patent Office 2,914,497
Patented Nov. 24, 1959

2,914,497

ROSINATE DISPERSING AGENTS IN CHLOROPRENE POLYMERIZATION

William J. Keller, Newark, Del., assignor to E. I. du Pont de Nemours and Company, Wilmington, Del., a corporation of Delaware No Drawing. Application July 3, 1956
Serial No. 595,585

4 Claims. (Cl. 260—27)

This invention relates to the preparation of elastomers, and more particularly to the polymerization of chloroprene in aqueous dispersions from which polychloroprene is obtained having superior properties and which may be readily isolated by simple drying procedures.

One common method for isolating polychloroprene elastomers from the aqueous dispersion (latex) in which form they are prepared is to apply the latex to a rotating internally refrigerated drum, thus freezing a uniform layer of the latex on the drum, according to U.S. Patent 2,187,146 of Calcott and Starkweather. The frozen latex containing the elastomer in a coagulated continuous sheet is then removed from the drum as it rotates, by means of a doctor knife, and is then thawed to melt the ice, washed with water to remove soluble materials, and dried, while being maintained throughout as a continuous sheet of elastomer. While this process gives a uniform and satisfactory product it requires special equipment in the freeze drying, and the extra step of washing with water increases the cost because of the time and labor required.

Solids can often be advantageously recovered from their aqueous dispersions in one operation by means of a drum drier, in which the total non-volatile solids are obtained as a dry layer which is then removed. Equivalent drying processes, including spray drying, are described in U.S. Patent 2,384,277 of Calcott and Starkweather, for isolating elastomers from their dispersions. When these methods are applied to the usual types of polychloroprene latex, however, the dried elastomer isolated is found to have poor curing properties and to swell to a serious extent when immersed in water in the cured state. This is not surprising, since the latex contains substantial amounts of dispersing agents (sodium rosinates, for example) and other water-soluble materials, which remain with the elastomer when it is isolated in this way. While ammonia soaps have been employed as dispersing agents in elastomer latices which soaps may be decomposed on drying to liberate the ammonia and leave in the elastomer only the free acid from which the soap is prepared (see U.S. Patent 2,001,791), and it would be expected that with only the free acid remaining in the elastomer the elastomeric polymer would have little tendency to absorb water, this process was found to have several serious disadvantages, giving a polymer which had properties which were not present when sodium rosinate was used in the polymerization. In the polymerization itself, larger proportions of initiators and modifying agents were required to give a satisfactory rate of polymerization and a product of the required plasticity, and in some cases the polymerization appeared to be entirely inhibited. More important, the polymer isolated, although it had good water resistance, was much inferior to the similar elastomers isolated by the freeze-roll and washing method in nerve and scorch on milling and compounding, and in stability on aging. These differences, although not great by older standards, are of great importance in relation to the strict specifications now applying to the elastomers.

It is an object of this invention to provide a polychloroprene dispersion which on drying will give an elastomer having satisfactory stability, milling properties, curing properties, and which will at the same time have good water resistance when cured. It is a further object of the invention to provide a method for producing polychloroprene in aqueous dispersions by a simple and economical process in which conventional equipment is employed, and which does not require the washing out of the water-soluble dispersing agents.

According to the present invention, a solid polychloroprene, fully equal to that isolated by freezing, washing and drying in the manner described above, may be made by carrying out the polymerization in an aqueous dispersion in which the dispersing agent is a mixture of rosinates corresponding to from 2 to 5 parts of rosin per 100 parts of polymer, and in which from 2 to 30 mol percent of the rosinates are alkali metal rosinates, the remainder being ammonium or alklyammonium rosinates derived from alkylamines boiling below 125° C. and in which the total amount of alkali metal ion present in the dispersion is not more than 0.15 part per 100 parts of elastomer.

The essential feature of this invention is the presence in the latex and in the polymer isolated therefrom of the quantities of alkali metal rosinate above specified.

Such dispersions may be made in various ways, as will be discussed below. A convenient method involves dissolving the rosin and enough aliphatic mercaptan to give a polymer of the desired plasticity in the chloroprene, and emulsifying this in water containing the alkali metal hydroxide and the ammonium or substituted ammonium hydroxide, and polymerizing in the presence of a persulfate catalyst system until 60% to 75% of the chloroprene has been polymerized, and then arresting the polymerization. The unchanged chloroprene is then removed by distillation. In this process, the amounts of rosin and of the hydroxides are calculated so as to give the desired proportions of rosinates, within the limits of the above definition, relative to the amount of polymer to be formed, the ammonium hydroxide being used in excess but combining only with that part of the rosin which is not neutralized by the alkali metal hydroxide. The amount of water used to make the emulsion is usually at least 110 parts per 100 parts of chloroprene and is selected so as to give a final latex of a convenient concentration, usually between 30% and 40% solids, taking into account the amount of polymer formed and the amount of water removed along with the unchanged chloroprene in the distillation step. More concentrated dispersions, up to 50% and above, may be used, however.

Any of the catalysts used for the polymerization of chloroprene may be used in carrying out the polymerization of the present invention. Peroxide catalysts such as benzoyl peroxide and azo catalysts such as alpha,-alpha'-azo-bis-isobutyronitrile (see U.S. Patent 2,471,-959) have the advantage of producing no electrolyte in the final product. The persalts, particularly the persulfates, are also suitable—see, for instance, U.S. Patent 2,494,087 which uses ammonium persulfate, potassium sulfite, and the sodium salt of anthraquinone beta-sulfonic acid. While this latter combination gives excellent results, satisfactory results may also by obtained without the addition of either the sulfite or the anthraquinone sulfonate, although their presence is desirable particularly when mercaptans are used as modifying agents in the present invention. The catalyst is used in the amount required to bring about polymerization at the desired rate, which will depend in part upon the rate at which heat can be removed from the polymerizing emulsion in the polymerization vessel used.

An effective method of arresting the polymerization is disclosed in U.S. Patent 2,576,009 of J. R. Goertz, using a mixture of thiodiphenylamine and para-tertiarybutyl catechol. Other phenolic compounds such as tertiarybutyl cresol may also be used with the thiodiphenylamine for this purpose.

An effective method of removing the unchanged chloroprene is to pass the latex continuously with steam through a pipe under conditions of turbannular flow and then separate the liquid from the vapor phase, as described in U.S. Patent 2,467,769 of R. W. Morrow and J. L. Parsons. This procedure also partly decomposes the ammonium rosinate and removes most of the free ammonia (or amine).

All ingredients of the latex discussed above may be varied widely as to nature and amount, except that it is required by the above definition of the invention that the amount of alkali metal ion should not be more than 0.15 part per 100 parts of polymer. Thus, it is in most cases preferred to use ammonium salts as the catalysts and other adjuvants. The invention does not depend on the method use for making the latex but only on its composition, which is defined above.

The dispersions of the present invention may also be made by polymerization in the presence of alkali metal rosinates only and removal of the unchanged chloroprene, followed by (a) replacing the alkali metal ions by ammonium or alkyl-ammonium ions by means of ion exchange agents until the composition given by the definition is reached or by (b) replacing the alkali metal ion completely by means of ion-exchange and then adding the required amount of alkali metal rosinate, or by (c) "creaming" the dispersion, separating the clear layer containing a major portion of the dispersing agent, and adding rosinates as required.

The discussion given above for the latices in which both ammonium and alkali metal rosinates are present during polymerization also applies in general to the latices just discussed. Suitable ion exchange resins for replacing alkali metal ions by ammonium or alkyl ammonia ions, which resins must be of the strongly acidic type, are those made commercially by sulfonation of copolymers of styrene and vinyl benzene. A satisfactory method for creaming polychloroprene latices is described in U.S. Patent 2,405,724 of Wilder.

Rosin and rosinate, as used in this specification, include not only the various rosins of commerce and the salts made by neutralizing them, but also their transformation products such as hydrogenated rosins and disproportionated rosin. The latter, in which the unsaturated ingredients of rosin are compensatingly hydrogenated and dehydrogenated to mixtures of the corresponding saturated and aromatic compounds, are particularly preferred.

It is sometimes desirable (but not essential) in the emulsion polymerization to supplement the rosinate dispersing agents by other dispersing agents, such as the salts of aromatic sulfonic acids. These are useful in reducing the small amount of coagulation which may occur in a continuous polymerization system, or when the latex must be held for some time before isolation of the polymer, or when the latex is distilled to remove unchanged chloroprene.

The chloroprene used should preferably contain no more than traces of the usual impurities. Hydrogen chloride is particularly objectionable not only because it neutralizes part of the alkali added thus reducing the amount of critical alkali metal rosinate, but also because the chloride thus formed increases the amount of electrolyte present in the dried polymer and therefore its water sensitivity. Organic impurities such as monovinylacetylene, divinylacetylene, acetaldehyde, methylvinylketone, etc., increase nerve and related properties or produce objectionable odor and color in the isolated polymer.

Any of the known methods may be used for making the polychloroprene in the dispersion plastic, such as polymerizing in the presence of sulfur and then plasticizing by means of a wide variety of agents, as described in U.S. Patent 2,234,215 of Youker, or by polymerizing in the presence of so-called modifying agents (see U.S. Patent 2,227,517 of Starkweather and Collins). Aliphatic mercaptans are particularly preferred. The aliphatic mercaptans are well known for their ability to produce plastic polymers, and need not be discussed here in detail. For the present purpose the mercaptans preferably contain 6 to 20 carbon atoms, which may occur in either a straight or branched chain; increasing their proportion to the chloroprene being polymerized increases plasticity and related properties but tends to impair the physical properties of the vulcanizates.

The amines which may be used in place of ammonia are the primary, secondary and tertiary alkylamines boiling below 125° C. and preferably below 50° C. These include methylamine, dimethylamine, triethylamine, propylamine and butylamine.

Of the alkali metal hydroxides, potassium is preferred to sodium and lithium because the potassium rosinate formed therefrom has less effect upon the water absorption of the cured polymers. Since most of the desirable effects of adding small amounts of alkali metal hydroxides result from their formation of the corresponding rosinates, they may be replaced by other alkaline materials such as carbonates, capable of neutralizing the rosin.

As explained eleswhere and illustrated in the examples, the alkali metal rosinate in the polymer improves stability, working properties, and certain properties of the vulcanizates. As the amount of rosinate is increased, the improvement tends to be greater, but on the other hand the tendency of the vulcanizates to swell in water also increases. By varying the proportion of alkali, superiority may be obtained in those properties which are of greatest importance under the particular circumstances. The higher proportions of alkali metal hydroxides present during the polymerization increase the utilization of the mercaptan, giving more plastic products when using the same proportion of mercaptan. Increasing the proportion of ammonia or alkylamine during the polymerization has a similar but usually smaller effect.

In selecting the various dispersing agents, catalysts and adjuvants in the polymerization system, weight should be given to the effect which they will produce upon the water sensitivity of the isolated polymer, which increases approximately linearly with the amount of alkali metal ion present in the final polymer. The latter should therefore be kept as low as consistent with other factors and should in no case exceed 0.15 part per 100 parts of polymer.

The polymer may be isolated from the dispersions of the present invention by any method which removes the water by evaporation and decomposes the ammonium or substituted ammonium salts. Two methods for which apparatus is commercially available are drum drying and spray drying.

The following examples are given to illustrate the invention. Parts are by weight, unless otherwise specified.

*Example 1*

A disproportionated wood rosin, purified by distillation (sold by the Hercules Powder Co. as "Resin 731–S"), is melted and dissolved in the proportion of 3 parts by weight, in 100 parts of purified chloroprene, along with 0.25 part of dodecyl mercaptan. This solution is emulsified in 118 parts of water containing 1.35 parts of ammonia (100% basis), 0.035 part of potassium hydroxide, 0.05 part of potassium sulfite and 0.1 part of the sodium salt of sulfonated dinaphthylmethane. The emulsification is effected under nitrogen with an Eppenbach homomixer, in which the mixture to be emulsified is repeatedly circulated through narrow passages between a rapidly moving and a stationary wall, thus subjecting it to high shear. The resulting emulsion is then polymerized under a blanket of nitrogen, with gentle agitation in a glass vessel surrounded by a bath by which the temperature of the emulsion is kept at 4° C. A catalyst solution containing 1.5% of ammonium persulfate and 0.15% of the sodium salt of anthraquinone beta-sulfonic acid is added as needed to maintain an approximately constant rate of polymerization, that is, an increase of about 0.0005 in density per minute. The density of this emulsion at 70% conversion of the chloroprene is 1.049, measured at 40° C. When this degree of polymerization is reached, further polymerization is stopped by adding 0.007 part of thiodiphenylamine and 0.0014 part of p-tertiarybutyl catechol, dissolved in toluene and emulsified in a water solution of the dimethylamine salt of disproportionated rosin. The unpolymerized chloroprene is then removed, along with the ammonia, by mixing with steam at 150 mm. pressure (60° C.) and passing the resulting mixture of liquid and vapor through a glass tube under conditions of turbannular flow into a receiver in which the ammonia, vaporized chloroprene, and excess steam are separated from the polychloroprene dispersion (latex). See U.S. Patent 2,467,769.

Drum drying is carried out on an 8-inch chromium-plated, double drum drier, using a drum speed of 20 r.p.m. and a steam pressure of 35 p.s.i.g. The latex is introduced continuously into the nip between the rolls. Sheets of dry, light-colored polymer are removed from the rolls by "doctor knives." This polymer, containing no ammonium or substituted ammonium salts, or at least no more than a trace of them, is now in finished form and has the desirable properties brought out by the tests described below.

Plasticity (viscosity) is determined by the two well-known methods of Williams and of Mooney, the higher numbers in each case corresponding to the lower degrees of plasticity and higher degrees of viscosity. Milling properties are evaluated by observing the behavior of polymers qualitatively on a rubber mill under identical conditions. Nerve is observed as part of the evaluation of milling properties and also quantitatively as "nerve number," determined by sheeting off a sample of polymer from a mill set at 0.025 inch clearance between the rolls, cooling the sheet to room temperature for 20 minutes and cutting a 3 x 6 inch sample from the shrunken and thickened sheet. The "nerve number" is given by $$\frac{\text{Wt. of cut sample} - 9.1}{9.1}$$

where 9.1 is the calculated weight (based on its density) of a sample 3 x 6 x 0.025 inch. Thus, a material without nerve would have a nerve number of zero. Stability is determined by comparing the Williams plasticity before and after aging for 10 days at 70° C. The compounding formula contains 4 parts of magnesium oxide, 5 parts of zinc oxide, 2 parts of phenyl beta-naphthylamine, and 0.35 part of 2-mercapto-thiazoline, per 100 parts of polymer. Scorching is estimated by observing the time required for a 5-point rise in Mooney viscosity of this compound at 250° F. Modulus, tensile strength and elongation at break are determined for 40 minute cures at 307° F. The swelling in water at 212° F. (percent volume increase) is also determined on these cured samples.

For comparison, to show the effect of the presence of the potassium rosinate in Example 1, a polymerization was carried out in the same way, using ammonium rosinate (in excess ammonium hydroxide) as the only rosinate and the polymer was isolated and tested in parallel with the polymer from Example 1. In the polymerization, 0.006 part of ammonium persulfate was required as catalyst to give 70% polymerization in 243 minutes, compared with only 0.0026 part for 217 minutes in Example 1. The test data follows:

|  | Example 1 | No Alkali Rosinate |
|---|---|---|
| Viscosity, Mooney | 41.5 | 49.5 |
| After milling | 38.5 | 43.5 |
| Plasticity, Williams | 100–12 | 104–14 |
| After 10 days at 70° C | 96–9 | 119–81 |
| Nerve Number | 3.0 | 4.6 |
| Scorch time (minutes) | 11.5 | 9.5 |
| Modulus (600% elongation) | 575 | 525 |
| Tensile strength | 2,800 | 2,475 |
| Elongation at break | 940 | 980 |
| Water swell | 11.3 | 11.3 |

The product of Example 1 shows better mill behavior.

*Example 2*

Example 1 is repeated, using 0.03 part of sodium hydroxide instead of 0.035 part of potassium hydroxide. The results are substantially the same, except that the swelling in water is somewhat higher, 12.4% compared with 10.1% for a run with potassium hydroxide made at the same time.

*Example 3*

Example 2 is repeated, using 0.0315 part of lithium hydroxide instead of the sodium hydroxide. The results are substantially the same. The water swell is 11.1%.

*Example 4*

Example 1 is repeated, using 0.16 part of octyl mercaptan in place of 0.25 part of dodecyl mercaptan. The Mooney viscosity, after milling, is 51 and the nerve number is 4.4. The tensile strength is 3100 and the water swell 10.4%. Raising the amount of octyl mercaptan to 0.205 part decreased the Mooney viscosity to 18.5 and the nerve number to 1.4.

*Example 5*

Using the general procedure of Example 1, 100 parts of purified chloroprene containing in solution 0.6 part of sulfur and 4 parts of disproportionated rosin (which has been partly neutralized by incorporating 2% of sodium carbonate) is emulsified under nitrogen in 143 parts of water containing 0.34 part of ammonia and 0.5 part of the sodium salt of sulfonated dinaphthylmethane. The polymerization is carried out under nitrogen with agitation at 40° C. As the polymerization preceeds, a 5% solution of ammonium persulfate is added in amounts increasing from 0.27 to 0.93 part at approximately 30 minute intervals to maintain an approximately uniform rate of polymerization. The total persulfate added is 0.18 part. Similarly, more ammonia is added (as a 15% solution) during the first half of the polymerization cycle to bring the total ammonia up to 0.85 part. After 5.5 hours, the polymerization is practically complete and 1 part of tetraethyl thiuram disulfide dispersed in water is added and the latex is then allowed to stand at laboratory temperature for 2.5 days. It is then dried on a drum drier as in Example 1. The polymer thus isolated was compared with a polymer made according to the method described in the introduction, by polymerizing in an analogous sodium rosinate system (no ammonia) and isolating by acidifying the rosinate, coagulating the polymer in a thin layer by freezing, then washing and drying. Using the same test formula as in Example 1 for curing, both polymers gave vulcanizates of very similar physical and electrical properties. For example, for 5 minute cures at 307° F.

|  | Ex. 5 | Polymer isolated by acidifying, freezing and washing |
|---|---|---|
| Modulus (200% elongation) | 150 | 175 |
| Modulus (400% elongation) | 625 | 800 |
| Tensile strength | 4,225 | 4,425 |
| Elongation at break, percent | 980 | 990 |
| Water swell (20 min. cure) percent | 13.5 | 11.8 |
| Resistivity, ohms per cm | 2.25×10$^{11}$ | 2.88×10$^{11}$ |
| Power factor, percent | 4.0 | 3.9 |

I claim:

1. In a process for preparing plastic polychloroprene by polymerization of chloroprene in an aqueous emulsion from which the plastic polychloroprene may be isolated by direct evaporation of the water after removal of the unpolymerized chloroprene to give a plastic polychloroprene having desirable physical properties, the step which comprises carrying out the polymerization in an aqueous emulsion containing from 50% to 70% of water, in which the dispersing agent is a mixture of rosinates corresponding to from 2 to 5 parts of rosin per 100 parts of polymer, of which 2 to 30 mol percent of the rosinates are alkali metal rosinates, the remainder being of the class consisting of ammonium rosinates and alkyl ammonium rosinates of alkylamines boiling below 125° C., the total amount of alkali metal ion in the dispersion being not more than 0.15 part per 100 parts of polymer.

2. In a process for preparing plastic polychloroprene by polymerization of chloroprene in an aqueous emulsion from which the plastic polychloroprene may be isolated by direct evaporation of the water after removal of the unpolymerized chloroprene to give a plastic polychloroprene having desirable physical properties, the step which comprises carrying out the polymerization in an aqueous emulsion containing from 50% to 70% of water, in which the dispersing agent is a mixture of rosinates corresponding to from 2 to 5 parts of rosin per 100 parts of polymer, of which 2 to 30 mol percent of the rosinates are potassium rosinates, the remaining portion of the rosinates being ammonium rosinates, the total amount of potassium ion in the dispersion being not more than 0.15 part per 100 parts of polymer.

3. In a process for preparing plastic polychloroprene by polymerization of chloroprene in an aqueous emulsion from which the plastic polychloroprene may be isolated by direct evaporation of the water after removal of the unpolymerized chloroprene to give a plastic polychloroprene having desirable physical properties, the steps which comprise carrying out the polymerization in an aqueous emulsion containing from 50% to 70% of water, in which the dispersing agent is a mixture of rosinates corresponding to from 2 to 5 parts of rosin per 100 parts of polymer, of which 2 to 30 mol percent of the rosinates are alkali metal rosinates, the remainder being of the class consisting of ammonium rosinates and alkyl ammonium rosinates of alkylamines boiling below 125° C., the total amount of alkali metal ion in the dispersion being not more than 0.15 part per 100 parts of polymer, removing the unpolymerized chloroprene, and evaporating the emulsion to isolate a plastic polychloroprene having good physical properties.

4. In a process for preparing plastic polychloroprene by polymerization of chloroprene in an aqueous emulsion from which the plastic polychloroprene may be isolated by direct evaporation of the water after removal of the unpolymerized chloroprene to give a plastic polychloroprene having desirable physical properties, the steps which comprise carrying out the polymerization in an aqeous emulsion containing from 50% to 70% of water, in which the dispersing agent is a mixture of rosinates corresponding to from 2 to 5 parts of rosin per 100 parts of polymer, of which 2 to 30 mol percent of the rosinates are potassium rosinates, the remaining portion of the rosinates being ammonium rosinates, the total amount of potassium ion in the dispersion being not more than 0.15 part per 100 parts of polymer, removing the unpolymerized chloroprene, and evaporating the emulsion to isolate a plastic polychloroprene having good physical properties.

References Cited in the file of this patent

UNITED STATES PATENTS

| 2,569,448 | Borglin et al. | Oct. 2, 1951 |
| 2,709,689 | Herzog et al. | May 31, 1955 |
| 2,776,953 | Taves | Jan. 8, 1957 |

OTHER REFERENCES

Ind. & Eng. Chem., pp. 928–31, vol. 40, No. 5, May 1948.

Whitby: Synthetic Rubber, p. 770, John Wiley (N.Y.), 1954.

UNITED STATES PATENT OFFICE
CERTIFICATE OF CORRECTION

Patent No. 2,914,497                                                      November 24, 1959

William J. Keller

It is hereby certified that error appears in the printed specification of the above numbered patent requiring correction and that the said Letters Patent should read as corrected below.

Column 5, line 14, for "4° C." read -- 40° C. --; column 6, line 75, after "307° F." insert a comma.

Signed and sealed this 10th day of May 1960.

(SEAL)
Attest:

KARL H. AXLINE                                                   ROBERT C. WATSON
Attesting Officer                                                Commissioner of Patents